United States Patent
Miyata

(10) Patent No.: US 9,092,702 B2
(45) Date of Patent: Jul. 28, 2015

(54) OUTPUT PROCESSING METHOD AND OUTPUT APPARATUS FOR SETTING A PAGE-TURNING PROCEDURE IN ASSOCIATION WITH IMAGE DATA, AND STORAGE MEDIUM STORING INSTRUCTIONS FOR OUTPUT APPARATUS

(71) Applicant: BROTHER KOGYO KABUSHIKI KAISHA, Nagoya-shi, Aichi-ken (JP)

(72) Inventor: Yuji Miyata, Kitanagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 9 days.

(21) Appl. No.: 13/933,553

(22) Filed: Jul. 2, 2013

(65) Prior Publication Data
US 2014/0002860 A1 Jan. 2, 2014

(30) Foreign Application Priority Data
Jul. 2, 2012 (JP) .................. 2012-148309

(51) Int. Cl.
*G06F 3/12* (2006.01)
*G06K 15/00* (2006.01)
*H04N 1/00* (2006.01)
*G06F 3/0483* (2013.01)
*G06F 3/0485* (2013.01)

(52) U.S. Cl.
CPC ............ *G06K 15/002* (2013.01); *G06F 3/0483* (2013.01); *G06F 3/0485* (2013.01); *H04N 1/0044* (2013.01); *H04N 1/0045* (2013.01); *H04N 1/00236* (2013.01); *H04N 1/00241* (2013.01); *H04N 1/00411* (2013.01); *H04N 1/00448* (2013.01); *H04N 1/00456* (2013.01); *H04N 1/00458* (2013.01); *H04N 1/00466* (2013.01); *H04N 2201/0049* (2013.01); *H04N 2201/0055* (2013.01); *H04N 2201/0075* (2013.01); *H04N 2201/0087* (2013.01); *H04N 2201/0089* (2013.01)

(58) Field of Classification Search
None
See application file for complete search history.

(56) References Cited

U.S. PATENT DOCUMENTS

| | | | | | |
|---|---|---|---|---|---|
| 5,463,725 | A | * | 10/1995 | Henckel et al. | 715/776 |
| 6,201,554 | B1 | * | 3/2001 | Lands | 345/169 |
| 6,512,497 | B1 | * | 1/2003 | Kondo et al. | 345/1.1 |
| 6,788,292 | B1 | * | 9/2004 | Nako et al. | 345/173 |

(Continued)

FOREIGN PATENT DOCUMENTS

| | | |
|---|---|---|
| JP | H11-212892 A | 8/1999 |
| JP | 2003-046700 A | 2/2003 |

(Continued)

*Primary Examiner* — King Poon
*Assistant Examiner* — Vincent Peren
(74) *Attorney, Agent, or Firm* — Merchant & Gould PC

(57) ABSTRACT

An output processing method used in an output apparatus which includes an output section configured to output at least one image based on at least one image data which has been acquired by an image-data acquiring device includes: acquiring a staple position of the at least one image which has been set in the at least one image data; setting a page-turning procedure which is an operating procedure for changing an image to be outputted to the output section to one of a subsequent image and a previous image based on the staple position; outputting the at least one image to the output section; receiving: an output according to the page-turning procedure; and changing the at least one image which has been outputted to the output section in accordance with the input according to the page-turning procedure.

15 Claims, 10 Drawing Sheets

(56) References Cited

U.S. PATENT DOCUMENTS

| | | |
|---|---|---|
| 6,922,255 B1 | 7/2005 | Tomida |
| 8,749,823 B2* | 6/2014 | Kato .................. 358/1.15 |
| 2002/0196478 A1* | 12/2002 | Struble .................. 358/474 |
| 2007/0168883 A1* | 7/2007 | Sugimoto .................. 715/818 |
| 2009/0066998 A1* | 3/2009 | Kato .................. 358/1.15 |
| 2010/0001980 A1* | 1/2010 | Kim et al. .................. 345/184 |
| 2011/0025625 A1* | 2/2011 | Hirako .................. 345/173 |
| 2011/0026069 A1* | 2/2011 | Jesudason et al. .................. 358/1.15 |
| 2011/0205374 A1 | 8/2011 | Shinagawa |
| 2011/0234515 A1* | 9/2011 | Kamijima .................. 345/173 |
| 2011/0235109 A1* | 9/2011 | Yamaguchi .................. 358/1.15 |
| 2011/0237303 A1* | 9/2011 | Matsuda .................. 455/566 |
| 2011/0248967 A1* | 10/2011 | Wang et al. .................. 345/204 |
| 2011/0292445 A1* | 12/2011 | Kato .................. 358/1.15 |
| 2011/0302490 A1* | 12/2011 | Koarai .................. 715/274 |
| 2011/0317193 A1* | 12/2011 | Iwase et al. .................. 358/1.13 |
| 2011/0317195 A1* | 12/2011 | Mitsui et al. .................. 358/1.13 |
| 2011/0317211 A1* | 12/2011 | Yamada et al. .................. 358/1.15 |
| 2012/0026522 A1* | 2/2012 | Igawa .................. 358/1.13 |
| 2012/0098836 A1* | 4/2012 | Kim et al. .................. 345/473 |
| 2012/0188154 A1* | 7/2012 | Lee .................. 345/156 |
| 2012/0293528 A1* | 11/2012 | Larsen .................. 345/589 |
| 2012/0311438 A1* | 12/2012 | Cranfill et al. .................. 715/256 |
| 2013/0033438 A1* | 2/2013 | Monteux et al. .................. 345/173 |
| 2013/0067366 A1* | 3/2013 | Almosnino .................. 715/764 |

FOREIGN PATENT DOCUMENTS

| | | |
|---|---|---|
| JP | 2006-065204 A | 3/2006 |
| JP | 2010-103692 A | 5/2010 |

* cited by examiner

Fig. 4

| STAPLE POSITION | NEXT BUTTON | PREVIOUS BUTTON | PAGE-FORWARDING DIRECTION | PAGE-RETURNING DIRECTION | PAGE ARRANGEMENT ORDER OF TWO-PAGE SPREAD |
|---|---|---|---|---|---|
| TOP | UPPER PORTION | LOWER PORTION | UPWARD DIRECTION | DOWNWARD DIRECTION | UP → DOWN |
| BOTTOM | LOWER PORTION | UPPER PORTION | DOWNWARD DIRECTION | UPWARD DIRECTION | DOWN → UP |
| LEFT | LEFT PORTION | RIGHT PORTION | LEFTWARD DIRECTION | RIGHTWARD DIRECTION | LEFT → RIGHT |
| RIGHT | RIGHT PORTION | LEFT PORTION | RIGHTWARD DIRECTION | LEFTWARD DIRECTION | RIGHT → LEFT |

OUTPUT PROCESSING METHOD AND OUTPUT APPARATUS FOR SETTING A PAGE-TURNING PROCEDURE IN ASSOCIATION WITH IMAGE DATA, AND STORAGE MEDIUM STORING INSTRUCTIONS FOR OUTPUT APPARATUS

CROSS REFERENCE TO RELATED APPLICATION

The present application claims priority from Japanese Patent Application No. 2012-148309, filed on Jul. 2, 2012, the disclosure of which is incorporated herein by reference in its entirety.

BACKGROUND OF THE INVENTION

1. Field of the Invention

The present invention relates to an output processing method for outputting an image based on image data, an output apparatus, and a storage medium storing instructions for the output apparatus.

2. Description of the Related Art

In Japanese Patent Application Laid-open No. 2003-46700, a technology for acquiring image data by a method such as scanning, and outputting an image based on the image data which has been acquired, to an output apparatus has been disclosed. The image data of the image which is to be outputted to the output apparatus is image data of a PDF (portable document format) file format.

SUMMARY OF THE INVENTION

An object of the present invention is to provide a technology which enables to improve an operability of an output apparatus for acquiring an output of an image in which a staple position desired by a user is reflected, based on image data which has been acquired by a method such as scanning.

According to an aspect of the present invention, there is provided an output processing method used in an output apparatus which includes an output section configured to output at least one image based on at least one image data which has been acquired by an image-data acquiring device, the method including: acquiring a staple position of the at least one image which has been set in the at least one image data; setting a page-turning procedure which is an operating procedure for changing an image to be outputted to the output section, to one of a subsequent image and a previous image based on the staple position; outputting the at least one image to the output section; receiving an input according to the page-turning procedure; and changing the at least one image which has been outputted to the output section in accordance with the input according to the page-turning procedure.

According to the output processing method in accordance with the aspect of the present invention, the page-turning procedure is set based on the staple position which has been set in the image data acquired by the image-data acquiring device, and by an operation according to the page-turning procedure, an image which is to be outputted to the output section is changed. Namely, a user is capable of changing the image which has been outputted to the output section to one of the subsequent image and the previous image by the page-turning operation based on the staple position, and it is possible to improve an operability of the output apparatus.

BRIEF DESCRIPTION OF THE DRAWINGS

FIG. 4 is a table showing a relationship of a staple position and a page-turning procedure which is set by execution of a viewer application.

DETAILED DESCRIPTION OF THE PREFERRED EMBODIMENTS

[First Embodiment]

Figure 1:
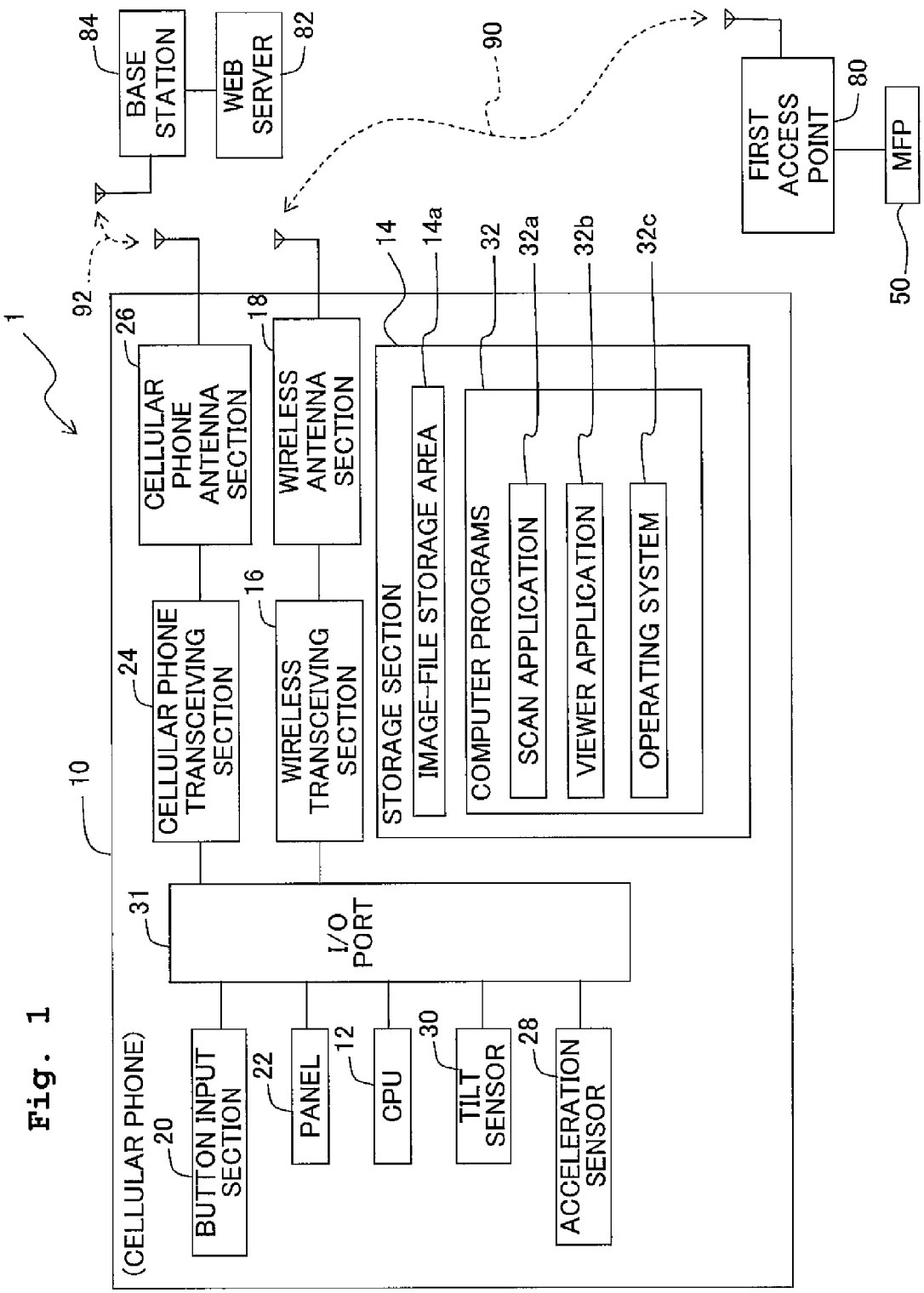
FIG. 1 is a block diagram of a communication system.

As shown in FIG. 1, a communication system 1 includes a cellular phone 10, an MET (abbreviation for Multifunction Peripheral) 50, a first access point 80, a web server 82, and a base station 84. The cellular phone 10 and the MFP 50 have a function as a known wireless LAN (local area network) terminal equipment. Moreover, the MFP 50 is a multifunction peripheral having functions such as a printer function, a scanner function, a copy function, and a facsimile function. The first access point 80 has a function as a known wireless LAN access point. The web server 82 is a device which provides functions and data possessed by the web server 82 to client devices in a network. The cellular phone 10 is an example of an output apparatus (computer). The MFP 50 is an example of an image-data acquiring device.

The cellular phone 10 and the first access point 80 are capable of wireless communication (data communication using radio waves) 90 conforming to an infrastructure mode of a wireless LAN method (a mode of communicating data by a plurality of wireless LAN terminal equipments via access points). In other words, the cellular phone 10 is capable of communicating data to the MFP 50 via the first access point 80 by making an access to the first access point 80 to be in a state of being capable of the wireless communication 90 conforming to the infrastructure mode of wireless LAN. As an example of the wireless LAN method, a method of communication stipulated by IEEE 802.11a/b/g/n standards can be cited.

A configuration of the cellular phone 10 will be described below. The cellular phone 10 includes mainly, a CPU (Central Processing Unit) 12, a storage section 14, a wireless transceiving section 16, a wireless antenna section 18, a button input section 20, a panel 22, a cellular phone transceiving section 24, a cellular phone antenna section 26, an acceleration sensor 28, and a tilt sensor 30.

The CPU 12 executes processing according to computer programs 32 stored in the storage section 14. In the description hereinafter, the CPU 12 which executes computer programs such as a scan application 32a and a viewer application 32b will also be referred to only by a computer-program name in some cases. For instance, "the scan application 32a" means "the CPU 12 which executes the scan application 32a" in some cases. The CPU 12 is an example of a processing section.

The storage section 14 is formed by a combination of a RAM (abbreviation for Random Access Memory), a ROM (abbreviation for Read Only Memory), a flash memory, a HDD (abbreviation for Hard Disc), and a buffer in the CPU 12. The storage section 14 has an image-file storage area 14a and stores the computer programs 32. Image files of formats, such as a PDF (portable document format), are stored in the image-file storage area 14a. An image file including at least one image data scanned by the MFP 50 can be cited as an example of the image file. The image file includes at least one image data and various types of setting information. The computer programs 32 include the scan application 32a, the viewer application 32b, and an operating system 32c. The scan application 32a is an application for the CPU 12 of the cellular phone 10 to make the MFP 50 execute a scan processing. The viewer application 32b is an application for making the CPU 12 execute a processing of displaying an image on the panel 22 based on image data stored in the image-file storage area 14a.

The operating system 32c is a computer program which provides basic functions to be used by the scan application 32a and the viewer application 32b. The operating system 32c includes computer programs such as a computer program for making the cellular phone transceiving section 24 execute telephonic conversation, and a computer program for making the wireless transceiving section 16 execute the wireless communication 90. Moreover, the operating system 32c is a computer program which provides an API (abbreviation for Application Programming Interface) for each computer program to acquire information which has been computed by sensors such as the acceleration sensor 28 and the tilt sensor 30, or for each computer program to give instructions to various hardware.

Moreover, the storage section 14 includes the image-file storage area 14a. The image-file storage area 14a is an area in which a plurality of image files are stored, The wireless transceiving section 16 carries out the wireless communication 90 conforming to the infrastructure mode of the wireless LAN, via the wireless antenna section 18. Moreover, the cellular phone transceiving section 24 carries out a wireless communication 92 conforming to a method of cellular phone communication, with the base station 84 via the cellular phone antenna section 26. Moreover, by sections such as the wireless transceiving section 16 and the cellular phone transceiving section 24, digital signals forming various data are transmitted and received.

The panel 22 includes a display screen which displays various functions of the cellular phone 10. The panel 22 is an example of an output section. The button input section 20 has a touch sensor, and is formed integrally with the panel 22. Moreover, the button input section 20 detects an approximation to and a contact with the panel 22 of an input medium, and receives a button operation by the user. Furthermore, the button input section 20 detects a sliding direction in a state that the input medium is approaching or is in contact with the panel 22, and receives a flick operation by the user. The acceleration sensor 28 is a sensor which measures an acceleration of the cellular phone 10 by detecting a change in a position of a weight. The tilt sensor 30 is a sensor which measures an angle of tilting by which the cellular phone 10 is tilted with respect to a horizontal plane, by detecting an angular velocity. The button input section 20, the acceleration sensor 28, and the tilt sensor 30 are examples of a sensor.

<Operation of Cellular Phone>

Figure 2:
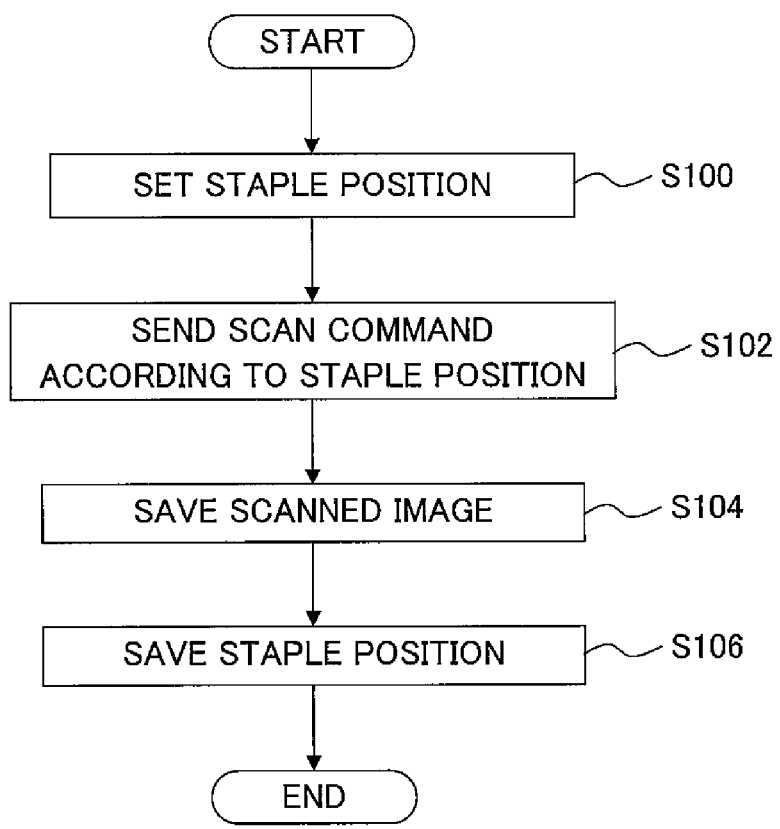
FIG. 2 is a flowchart showing an operation of an MFP (multifunction peripheral).

An operation of the cellular phone 10 according to a first embodiment will be described below. In the cellular phone 10, a processing for acquiring a plurality of image data from a plurality of documents by a scanner of the MFP 50 is carried out by using the scan application 32a. Concretely, a flow for acquiring the plurality of image data will be described below by using FIG. 2.

At step S100, the CPU 12 sets a staple position which has been selected by the user. To elaborate, the CPU 12 makes the panel 22 display a selection button for selecting the staple position of a document to be scanned. Moreover, the CPU 12 sets the staple position according to the button that has been selected by the user.

At step S102, the CPU 12 transmits a command for executing a scan processing based on the staple position that has been set, to the MFP 50. The MFP 50, in response to the command which has been received, scans a plurality of documents which has been set on a document feed tray, and generates a plurality of image data. At step S104, the CPU 12 acquires the plurality of image data from the MFP 50, and saves the plurality of image data which has been acquired, in the image-file storage area 14a. At this time, the plurality of image data is saved in the image-file storage area 14a as page data indicating each page of an image file. At step S106, the CPU 12 associates information indicating the selected staple position with the image data which has been acquired, and saves in the image-file storage area 14a. At this time, the information indicating the staple position is saved in the image-file storage area 14a as setting information included in the image file.

An image based on the image data acquired as mentioned above is displayed on the panel 22 by using the viewer application 32b, and the image displayed on the panel 22 is changed one by one by a page-turning operation by the user. A flow for carrying out the display of the image on the panel 22 based on the image data, and the change of the image based on the page-turning operation will be described below concretely while referring to FIG. 3. At step S200, the CPU 12 reads from the image-file storage area 14a, the information indicating the staple position which has been stored in the image-file storage area 14a and associated with the image data of the image to be displayed.

At step S202, in accordance with the information indicating the staple position which has been read, the CPU 12 displays a next button and a previous button on the panel 22. The next button is a button for forwarding an image displayed on the panel 22 to a subsequent image, and the previous button is a button for returning the image displayed on the panel 22 to a previous image. The display of the next button and the previous button on the panel 22 by the CPU 12 is carried out according to a table shown in FIG. 4.

Figure 5:
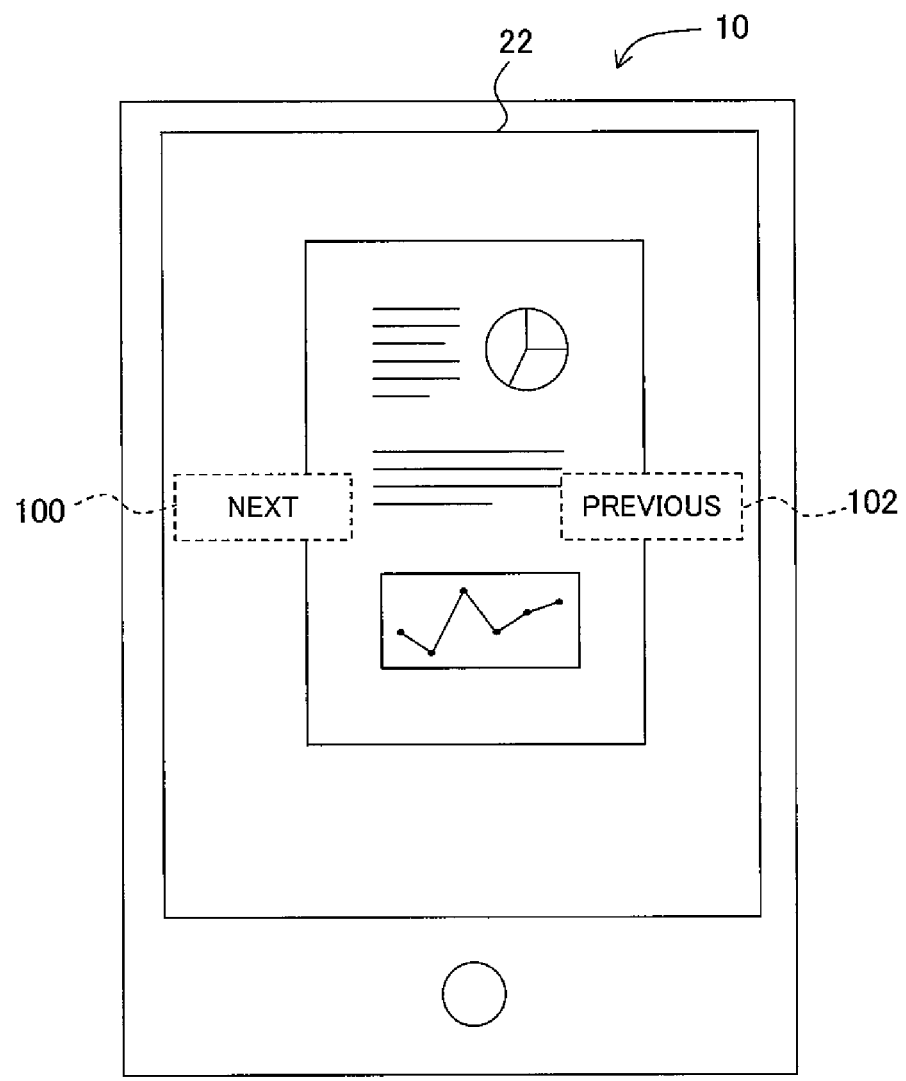
FIG. 5 is a diagram showing an example of a panel of the cellular phone in which an image having a staple position on a left side is displayed.
Figure 6:
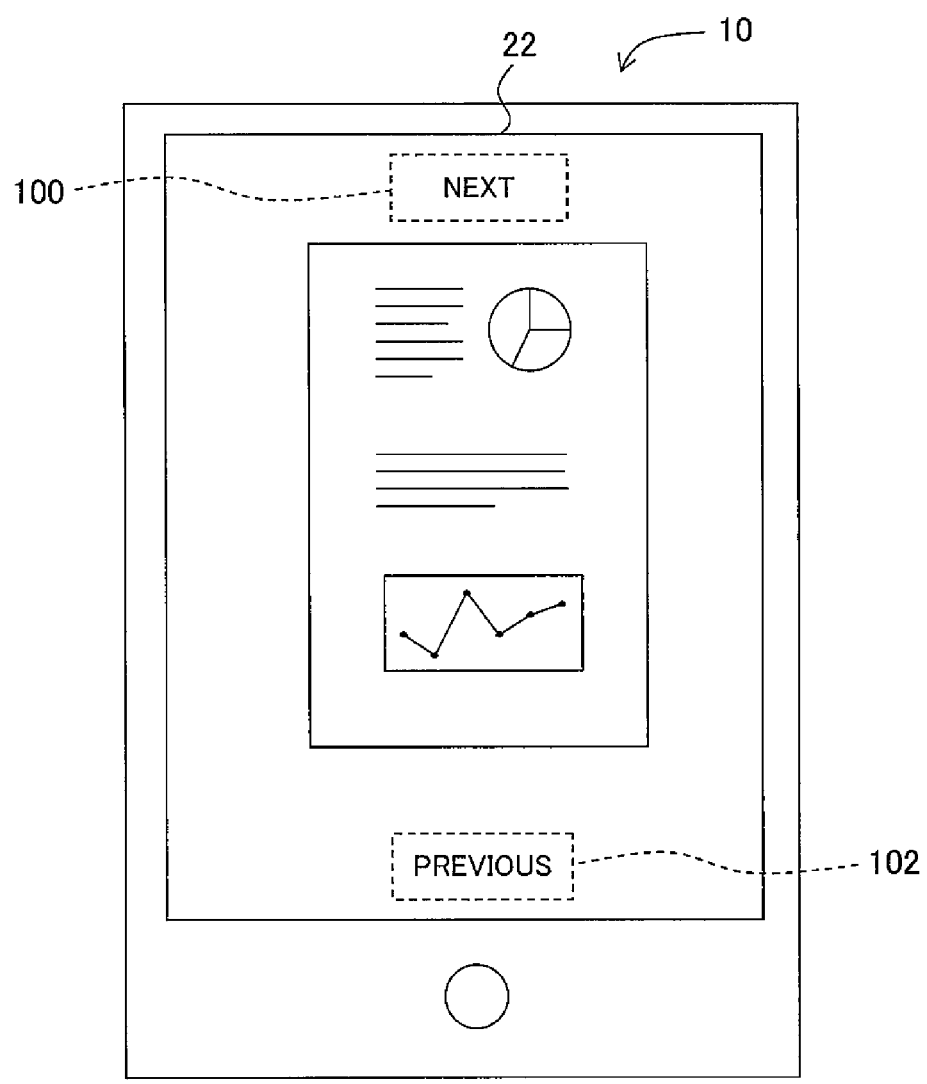
FIG. 6 is a diagram showing an example of the panel of the cellular phone in which an image having the staple position on a top side is displayed.

Concretely, in a case that the staple position is set to be left, as shown in FIG. 5, the CPU 12 displays the next button 100 on a display portion near a left side of the display screen of the panel 22, and displays the previous button 102 on a portion near a right side of the display screen of the panel 22. On the other hand, in a case that the staple position is set to be right, the CPU 12 displays the next button 100 on the portion near the right side of the display screen of the panel 22, and displays the previous button 102 on the portion near the left side of the display screen of the panel 22. Moreover, in a case that the staple position is set to be top, as shown in FIG. 12, the CPU 12 displays the next button 100 on a portion near an upper side of the display screen of the panel 22, and displays the previous button 102 on a portion near a bottom side of the display screen of the panel 22. On the other hand, in a case that the staple position is set to be bottom, the CPU 12 displays the next button 100 on the portion near the bottom side of the display screen of the panel 22, and displays the previous button 102 on the portion near the top side of the display screen of the panel 22. The next button 100 and the previous button 102 are examples of an operation button.

At step S204, the CPU 12 determines a page-forwarding direction and a image-returning direction by a flick operation based on the staple position which has been read. Concretely, as shown in FIG. 4, the CPU 12 determines the page-forwarding direction by a flick operation to be a staple direction from a center of the panel 22 toward the staple position which has been read, and determines the page-returning direction by a flick operation to be a direction opposite to the staple direction. In other words, the CPU 12 determines the page-forwarding direction and the page-returning direction such that a page is forwarded when a flick direction coincides with the staple direction, and the page is returned when the flick direction is opposite to the staple direction.

Concretely, in a case that the staple position has been set to be left, the CPU 12 determines the page-forwarding direction by a flick operation to be a leftward direction, and the page-returning direction by a flick operation to be a rightward direction. On the other hand, in a case that the staple position has been set to be right, the CPU 12 determines the page-forwarding direction by a flick operation to be the rightward direction, and the page-returning direction by a flick operation to be the leftward direction. Moreover, in a case that the staple position has been set to be top, the CPU 12 determines the page-forwarding direction by a flick operation to be an upward direction, and the page-returning direction by a flick operation to be a downward direction. On the other hand, in a case that the staple position has been set to be bottom, the CPU 12 determines the page-forwarding direction by a flick operation to be the downward direction, and the page-returning direction by a flick operation to be the upward direction.

In other words, at steps S202 and S204, the CPU 12 determines the page-turning procedure, which is an operating procedure for changing the image to be displayed on the panel 22 to the subsequent image or the previous image, based on the staple position which has been read at step S200, as shown in the table in FIG. 4. A relationship shown in the table in FIG. 4 may be stored as a table in the storage section 14 and read by the CPU 12 from the storage section 14, or may be programmed in advance in the viewer application 32b.

At step S206, the CPU 12 sets a variable i corresponding to a page number of the image to be displayed on the panel 22, to be 1. At step S208, the CPU 12 displays an image which has the same page number as the variable i on the panel 22. Page numbers are set to the plurality of image data which has been scanned in an order of scanning, and the page number of the image data, which has been scanned first among the plurality of image data, is 1. Therefore, in a case that the variable i is set to be 1, an image based on the image data which has been scanned first is displayed on the panel At step S210, the CPU 12 judges whether the next button 100 has been pressed or not. In a case that the next button 100 has not been pressed (NO at step S210), the process advances to step S212. At step S212, the CPU 12 judges whether the page-forwarding direction which has been determined and the flick direction are same or not. In other words, the CPU 12 judges whether the flick operation has been carried out in the page-forwarding direction or not. In a case that the flick operation has not been carried out in the page-forwarding direction (NO at step S212), the process advances to step S214.

At step S214, the CPU 12 judges whether the cellular phone 10 has been shaken or not by a specific amount. Concretely, the CPU 12 acquires the acceleration of the cellular phone 10 from the acceleration sensor 28 by using the API, and judges whether the acquired acceleration exceeds a threshold value or not. In a case that the acquired acceleration exceeds the threshold value, the CPU 12 judges that the cellular phone 10 has been shaken by the specific amount, and in a case that the acquired acceleration does not exceed the threshold value, the CPU 12 judges that the cellular phone 10 has not been shaken by the specific amount. Moreover, in a case that the cellular phone 10 has been shaken by the specific amount (YES at step S214), the process advances to step S216. Moreover, in a case that the next button 100 has been pressed (YES at step S210), or in a case that the flick operation has been carried out in the page-forwarding direction (YES at step S212), the process advances to step S216. At step S216, the CPU 12 adds 1 to the variable i, and sets a new variable i. Next, the process advances to step S208.

On the other hand, in a case that the cellular phone 10 has not been shaken by the specific amount (NO at step S214), the process advances to step S218. At step S218, the CPU 12 judges whether the previous button 102 has been pressed or not. In a case that the previous button 102 has not been pressed (NO at step S218), the process advances to step S220. At step S220, the CPU 12 judges whether the page-returning direction which has been determined and the flick direction are same or not. In other words, the CPU 12 judges whether the flick operation has been carried out in the page-returning direction or not. In a case that the flick operation has not been carried out in the page-returning direction (NO at step S220), the process returns to step S210.

On the other hand, in a case that the flick operation has been carried out in the page-returning direction (YES at step S220), the process advances to step S222. Moreover, in a case that the previous button 102 has been pressed (YES at step S218), the process advances to step S222. At step S222, the CPU 12 subtracts 1 from the variable i, and sets a new variable i. Next, the process returns to step S208.

[Effect]

In the cellular phone 10 according to the first embodiment, the procedure for turning the page is changed based on the information indicating the staple position which has been set in the image data of the image to be displayed on the panel 22. Concretely, the page-forwarding direction and the page-returning direction by the flick operation are determined based on the information indicating the staple position which has been set, and the page-forwarding direction and the page-returning direction are determined such that the page-forwarding direction by the flick operation coincides with the staple direction from a center of the panel 22 toward the staple position, and the page-returning direction by the flick operation is a direction opposite to the staple direction. Therefore, in a case that the user wants to change the image displayed on the panel 22 to the subsequent image, the user slides an input medium such as a finger in the staple direction, and in a case that the user wants to return the image displayed on the panel 22 to the previous image, the user slides the input medium in the direction opposite to the staple direction. To other words, by sliding the input medium in a manner similar to flipping a plurality of stapled manuscripts, the user can change the image displayed on the panel 22 one after another. Accordingly, the user is capable of carrying out the page-turning operation intuitively with respect to the image displayed on the panel 22.

Moreover, in the cellular phone according to the first embodiment, display positions of the next button 100 and the previous button 102 are changed based on the information indicating the staple position which has been set. Concretely, the next button 100 is displayed on a portion of the panel 22, on a side corresponding to the staple position, and the previous button 102 is displayed on a portion of the panel 22, on a side opposite to the staple position. In other words, by operating the button positioned in the direction in which the user wants to turn over the plurality of stapled manuscripts, the user can turn aver the images displayed on the panel 22. Accordingly, the user is capable of carrying out the page-turning operation intuitively with respect to the image displayed on the panel 22.

Moreover, in the cellular phone according to the first embodiment, it is possible to carry out the page-turning operation with respect to the image displayed on the panel 22 by a procedure which is different from the procedure determined based on the information indicating the staple position. Concretely, by shaking the cellular phone 10 by a specific amount, the user can change the image displayed on the panel 22 to the subsequent image. In other words, it is possible to carry out the page-turning operation irrespective of the staple position. Accordingly, the user is capable of carrying out the page-turning operation by a number of methods, and it is convenient for the user.

[Second Embodiment]

An operation of a cellular phone 10 according to a second embodiment will be described below. Since a configuration of a communication system 1 including the cellular phone 10 is same as the configuration of the communication system in the first embodiment, the description thereof will be omitted here.

In the cellular phone 10 according to the second embodiment, a plurality of images are displayed on the panel 22 by using the viewer application 32b, and by the page-turning operation, the plurality of images displayed on the panel 22 are changed sequentially. Concretely a flow for displaying the plurality of images on the panel 22, and changing the images based on the page-turning operation will be described below by usinig FIG. 7.

Figure 3:
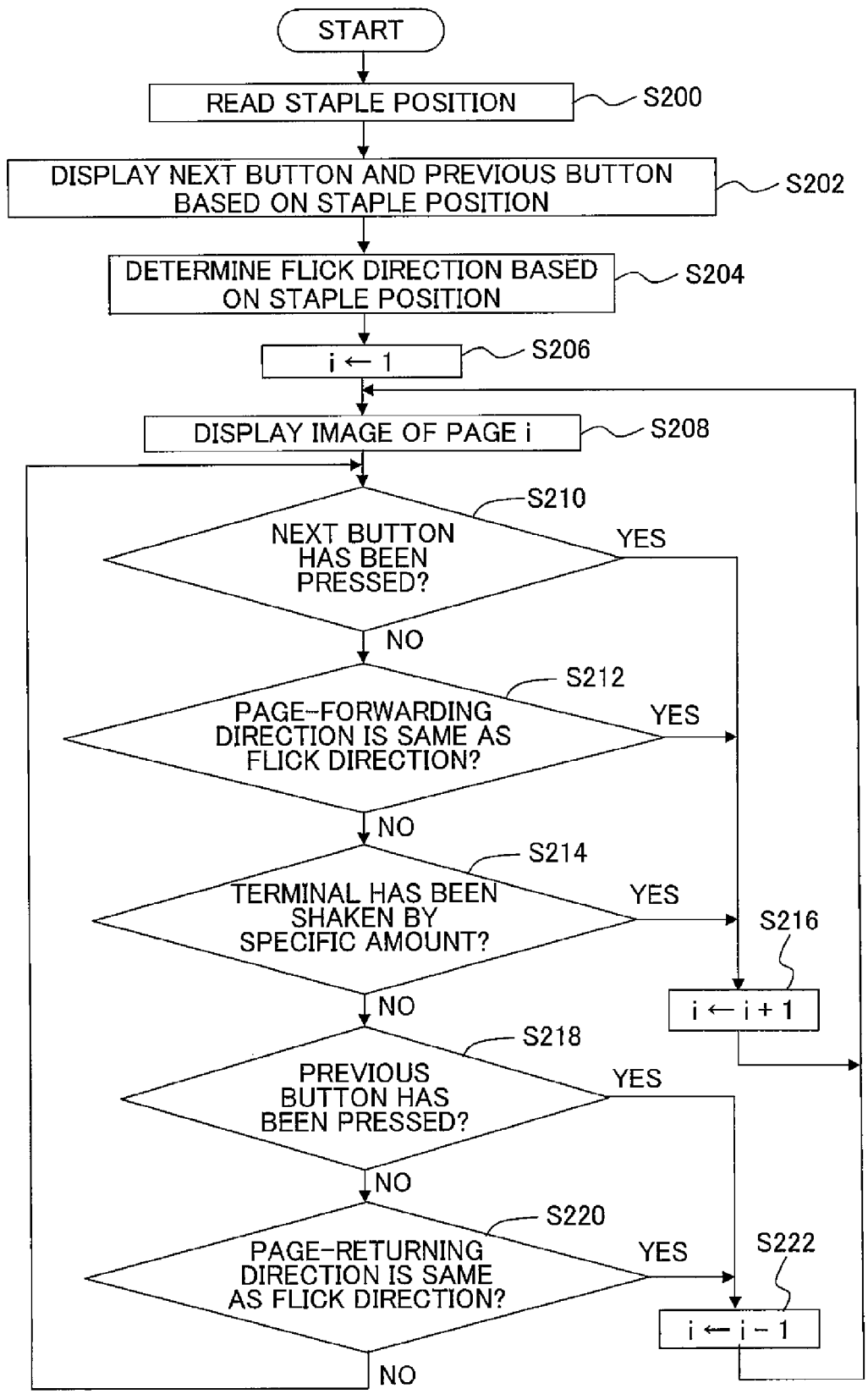
FIG. 3 is a flowchart showing an operation of a cellular phone.
Figure 7:
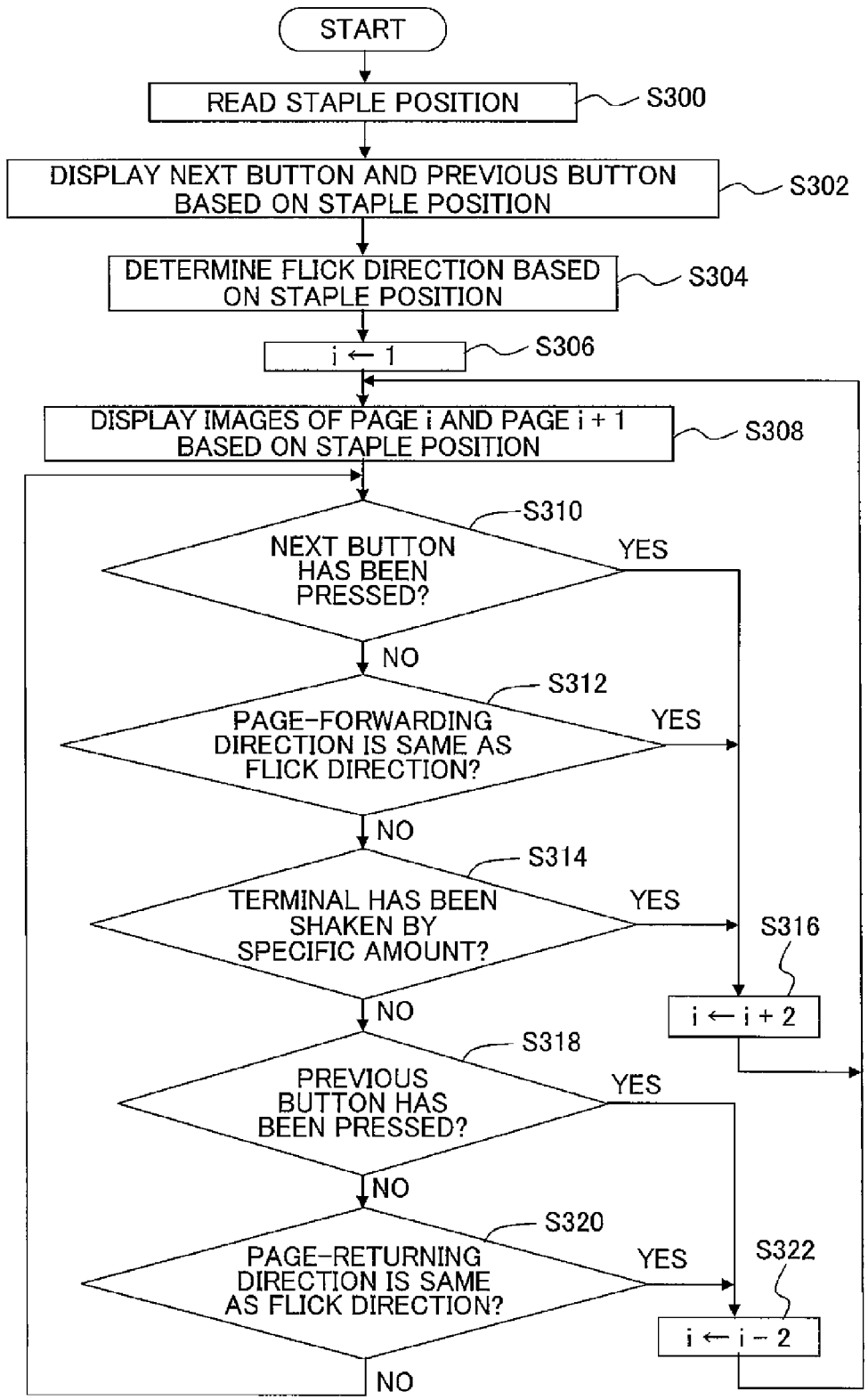
FIG. 7 is a flowchart showing an operation of the cellular phone.

Since contents of steps of the flow shown in FIG. 7 are same as the contents of the steps of the flow shown in FIG. 3 except for steps S308, S316, and S322, contents of the steps S308, S316, and S322 will be described below. After the processing at step S306, at step S308, the CPU 12 displays images having page numbers same as the variable i and the variable i+1 on the panel 22 based on the staple position, according to the table shown in FIG. 4. In other words, the CPU 12 displays, on the panel 22, two images so that a left page and a right page or an upper page and a lower page of the plurality of manuscripts stapled at a predetermined staple position are displayed at a time (two-page spread state).

Figure 8:
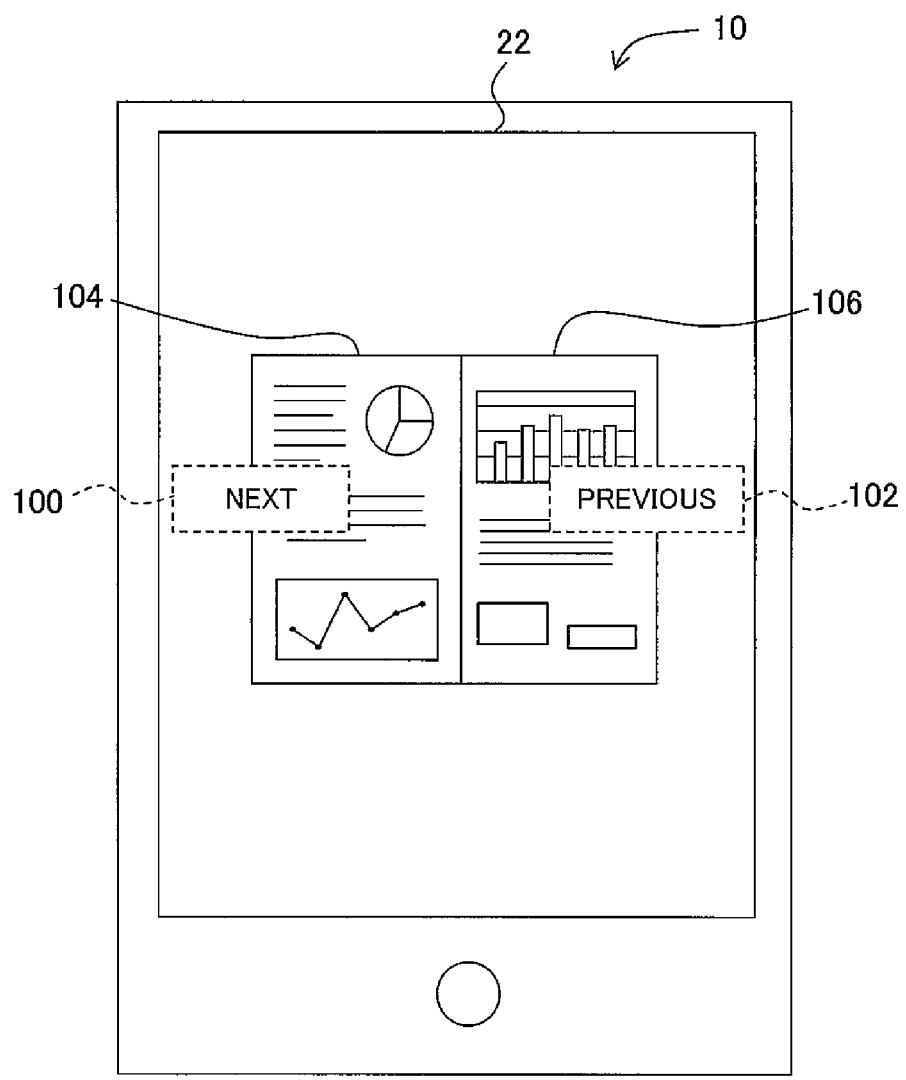
FIG. 8 is a diagram showing an example of the panel of the cellular phone in which two images having the staple position on a left side are displayed.

Concretely, in a case that the staple position is set to be left, the CPU 12 displays a predetermined image 104 and an image 106 subsequent to the image 104 so that the image 104 and the image 106 are arranged horizontally in a direction from a left side toward a right side of the panel 22. In other words, as shown in FIG. 8, the CPU 12 displays the predetermined image 104 in an area on the left side of the panel 22, and displays the subsequent image 106 in an area on the right side of the panel 22.

Moreover, in a case that the staple position is set to be right, the CPU 12 displays the predetermined image 104 and the subsequent image 106 so that the image 104 and the image 106 are arranged horizontally in a direction from the right side of the panel 22 toward the left side of the panel 22. In other words, the CPU 12 displays the predetermined image 104 in the area on the right side of the panel 22, and displays the subsequent image 106 in the area on the left side of the panel 22.

Figure 9:
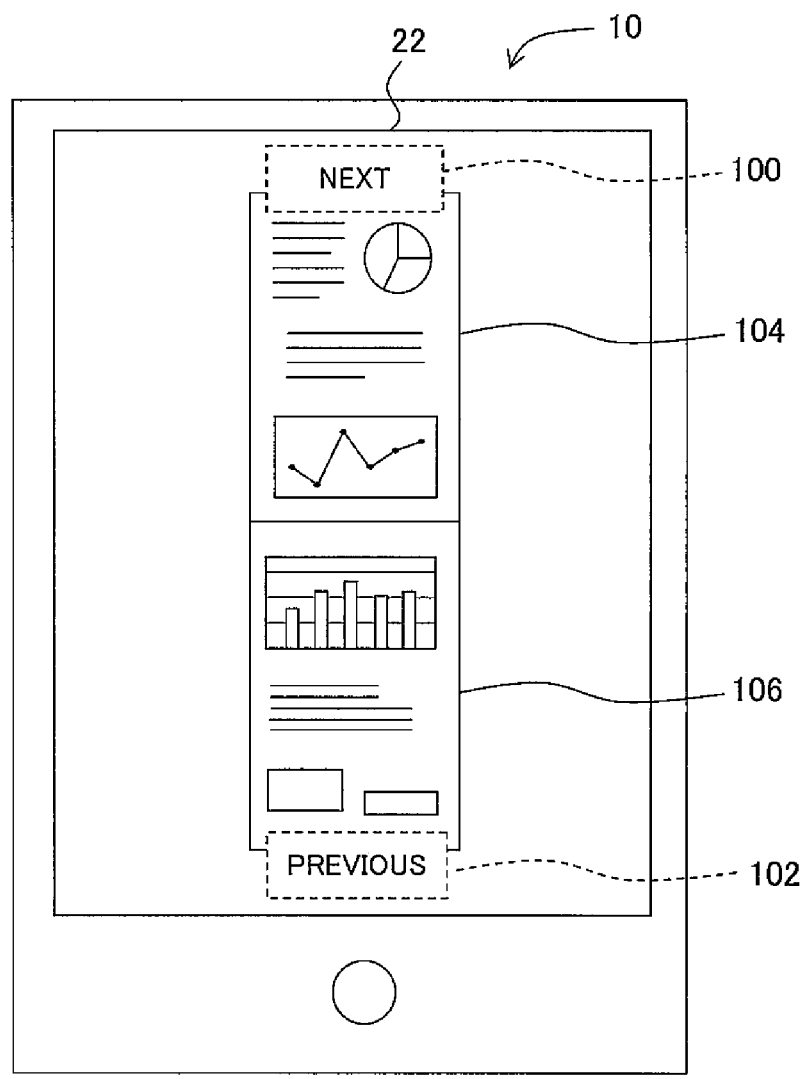
FIG. 9 is a diagram showing an example of the panel of the cellular phone in which two images having the staple position on a top side are displayed.

Moreover, in a case that the staple position is set to be top, the CPU 12 displays the predetermined image 104 and the subsequent image 106 so that the image 104 and the image 106 are arranged vertically in a direction from an upper side toward a lower side of the panel 22. In other words, as shown in FIG. 9, the CPU 12 displays the predetermined image 104 in an area on the upper side of the panel 22, and displays the subsequent image 106 in an area on the lower side of the panel 22. Moreover, in a case that the staple position is set to be the bottom, the CPU 12 displays the predetermined image 104 and the subsequent image 106 so that the image 104 and the image 106 are arranged vertically in a direction from the lower side toward the upper side of the panel 22. In other words, the CPU 12 displays the predetermined image 104 in the area on the lower side of the panel 22, and displays the subsequent image 106 in the area on the upper side of the panel 22. Next, the process advances to step S310.

Moreover, in a case that the next button 100 has been pressed (YES at step S310), in a case that the flick operation has been carried out in the determined page-forwarding direction (YES at step S312), or in a case that the cellular phone 10 has been shaken by a specific amount (YES at step S314), the process advances to step S316. At step S316, the CPU 12 adds 2 to the variable i, and sets a new variable i. Next, the process returns to step S308. Accordingly, two pages are forwarded by each page-forwarding operation.

In a case that the previous button 102 has been pressed (YES at step S318), or in a case that the flick operation has been carried out in the determined page-returning direction (YES at step S320), the process advances to step S322. At step S322, the CPU 12 subtracts 2 from the variable i, and sets a new variable Next, the process returns to step S308. Accordingly, two pages are returned by each page-returning operation.

[Effect]

Even in the cellular phone 10 according to the second embodiment, the page-turning procedure has been set based on the information indicating the staple position, similar to the cellular phone 10 according to the first embodiment. Accordingly, even in the cellular phone 10 according to the second embodiment, the user can perform the page-turning operation intuitively with respect to the image displayed on the panel 22.

Moreover, in the cellular phone 10 according to the second embodiment, it is possible to carry out the page-turning operation with respect to the image displayed on the panel 22 by a procedure which is different from the procedure determined based on the information indicating the staple position, similar to the cellular phone 10 according to the first embodiment. Concretely, the image displayed on the panel 22 is changed to the subsequent image in a case that the cellular phone 10 is shaken by the specific amount. Accordingly, even in the cellular phone 10 according to the second embodiment, the user is capable of carrying out the page-turning operation by a number of methods, and it is convenient for the user.

Furthermore, in the cellular phone 10 according to the second embodiment, the two consecutive images are displayed on the panel 22 in the two-page spread state corresponding to the information indicating the staple position. In other words, the two images are displayed on the panel 22 in a state that the plurality of documents stapled in accordance with the staple position which has been set are spread practically. Accordingly, the user can view the images displayed on the panel 22 with the same feeling as viewing the plurality of documents stapled according to the staple position,

[Modified Embodiments]

In the embodiments described above, the image data of the image to be displayed on the panel 22 by using the viewer application 32b is data which has been acquired from the MFP 50. However, it is possible to acquire the image data by various methods. For instance, the image data may be acquired from a non-volatile memory which has been inserted in a memory slot not shown in the diagram, or may be acquired from the web server 82.

Moreover, in the embodiments described above, the page-turning operation has been carried out by the flick operation. However, the page-turning operation may be carried out by tilting the cellular phone 10. Concretely, the page-turning operation may be carried out such that a page is forwarded when a tilting direction, which is a direction in which the cellular phone 10 is tilted, coincides with the staple direction, and a page is returned when the tilting direction is opposite to the staple direction. Incidentally the tilting direction includes a direction from a mounting surface of a casing of the cellular phone 10 on which the panel 22 is installed, toward a non-mounting surface of the casing of the cellular phone 10 on which the panel 22 is not installed, and a direction from the non-mounting surface toward the mounting surface. The direction from the mounting surface toward the non-mounting surface may also be referred to as a first tilting direction and the direction from the non-mounting surface toward the mounting surface may also be referred to as a second tilting direction.

Concretely, in a case that the staple position has been set to be left, an arrangement may be made as follows. Namely when the cellular phone 10 is tilted such that a left side of the panel 22 as viewed from the user is directed toward the first tilting direction, the page-forwarding operation is carried out, and when the cellular phone 10 is tilted such that the left side is directed toward the second tilting direction, the page-returning operation is carried out. On the other hand, in a case that the staple position has been set to be right, an arrangement may also be made as follows. That is, when the cellular phone 10 is tilted such that a right side of the panel 22 as viewed from the user is directed toward the first tilting direction, the page-forwarding operation is carried out, and when the cellular phone 10 is tilted such that the right side is directed toward the second tilting direction, the page-returning operation is carried out. Moreover, in a case that the staple position has been set to be top, an arrangement may also be made as follows. Namely, when the cellular phone 10 is tilted such that a tap side of the panel 22 as viewed from the user is directed toward the first tilting direction, the page-forwarding operation is carried out, and when the cellular phone 10 is tilted such that the top side is directed toward the second tilting direction, the page-returning operation is carried out. On the other hand, in a case that the staple position has been set to be bottom, an arrangement may also be made as follows. That is, when the cellular phone 10 is tilted such that a lower side of the panel 22 as viewed from the user is directed toward the first tilting direction, the page-forwarding operation is carried out, and when the cellular phone 10 is tilted such that the bottom side is directed toward the second tilting direction, the page-returning operation is carried out. By making such arrangement, the user can change the image displayed on the panel 22 one after another by tilting the cellular phone 10 in the same manner as turning over the plurality of stapled documents. Accordingly, the user is capable of carrying out the page-turning operation intuitively with respect to the image displayed on the panel 22.

Moreover, in a case of setting the page-forwarding operation based on the information indicating the tilting direction of the cellular phone 10, the page-forwarding operation may be set when the cellular phone 10 is tilted in the first tilting direction, and thereafter the cellular phone 10 is returned to an original position, namely to the second tilting direction. Or, when the cellular phone 10 is turned in the first tilting direction, the page-forwarding direction may be set based on the turning direction. Furthermore, when the cellular phone 10 is tilted in a vertical direction, namely, in a direction of gravitational force, the page-forwarding operation may be set based on the direction of gravitational force.

Incidentally, it is possible to detect the tilting direction of the cellular phone 10 by various sensors such as the acceleration sensor 28 and the tilt sensor 30.

Figure 10:
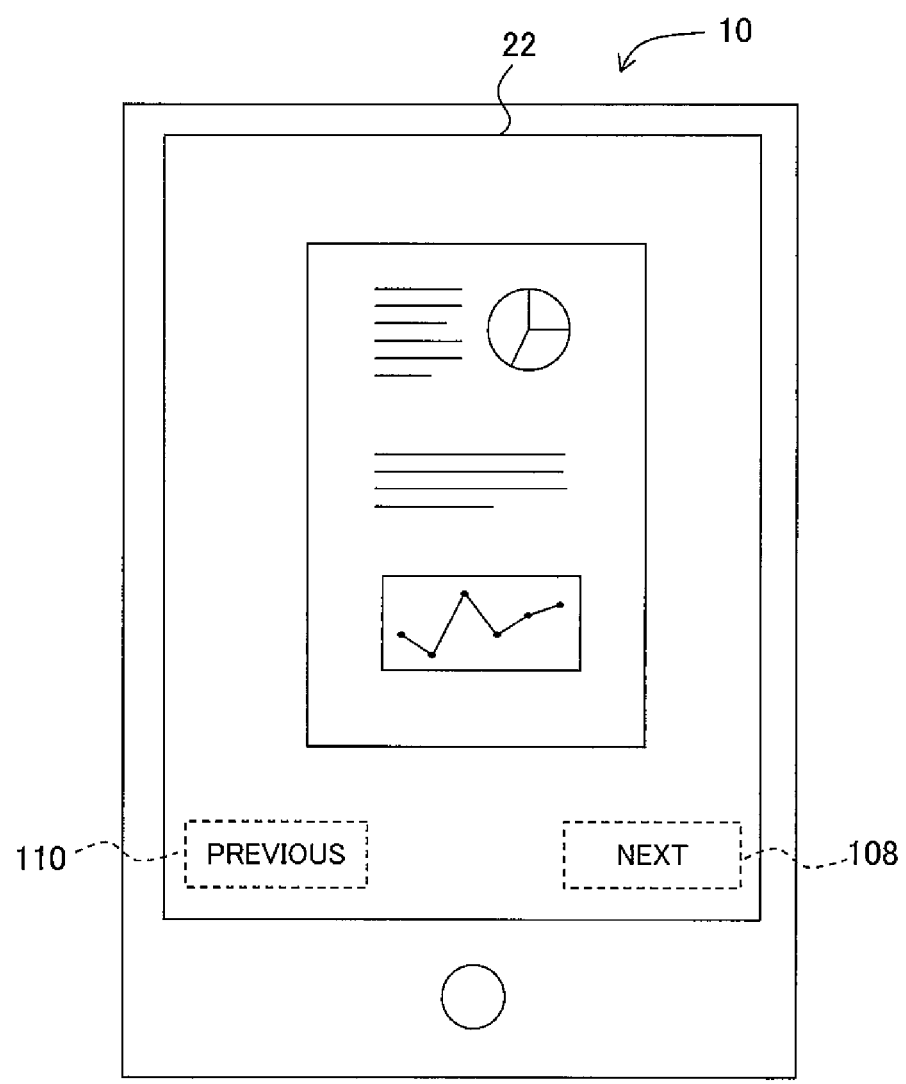
FIG. 10 is a diagram showing a modified example of the panel of the cellular phone in which an image is displayed.

Moreover, in the embodiments described above, the page-turning operation has been carried out when the cellular phone 10 is shaken by a specific amount, irrespective of the staple position. However, it is possible to carry out the page-turning operation irrespective of the staple position, by various methods. For instance, a voice recognition device may be provided to the cellular phone 10, and the page-turning operation may be carried out based on the voice recognized by the voice recognition device. Moreover, a next button and a previous button, of which display locations are not changed according to the staple position, may be displayed on the panel 22, and the page-turning operation may be carried out by operations to the next button or the previous button provided. Concretely, at the time of displaying an image on the panel 22, a next button 108 may be displayed on a lower-right corner of the panel 22, and a previous button 110 may be displayed on a lower-left corner of the panel 22 as shown in FIG. 10. The next button 108 and the previous button 110 are displayed at the same position without the display positions being changed according to the staple position. Accordingly, it is possible to carry out the page-turning operation with respect to an image displayed on the panel 22 by a procedure which is different from a procedure determined based on the staple position. When the next button 108 and the previous button 110 are to be displayed on the panel 22, it is desirable not to display the next button 100 and the previous button 102, of which display positions are changed based on the staple position.

Moreover, a device which is capable of displaying an image based on image data, and changing the displayed image based on the page-turning operation is not restricted to the cellular phone 10. It may also be a device such as a notebook personal computer or a tablet device.

In the cellular phone 10 according to the embodiments described above, the CPU 12 executing carries out various processings based on the scan application 32a. However, the present invention is not restricted to these embodiments. The CPU 12 may give instructions to carry out various processings to the operating system 32c, another system, or a hardware configuration based on the scan application 32a.

Technology components described in the present specification and diagrams exert technical utility individually or by various combinations, and are not restricted to the combinations described in claims at the time of filing the present application. Moreover, a technology exemplified in the present specification and diagrams achieves a plurality of objectives simultaneously, and has a technical utility by achieving one of the objectives.

Each computer program may be formed by one computer program module or by a plurality of computer program modules. Moreover, configurations exemplified in the above embodiments may be other configurations which are replaceable. Such replaceable arrangements are also involved in a category of the present invention. It may be a computer (CPU 12) which executes processing based on the computer program (scan application 32a), or may be a computer which executes processing according to a computer program other than the computer program of the aforementioned embodiments such as an operating system, other application, and computer program, or may be a hardware configuration (such as panel 22) which is operated according to instructions from a computer, or may be an arrangement in which a computer and hardware are linked. As a matter of course, it may be a computer which executes processing by linking processing according to a plurality of programs, or a hardware configuration which is operated accordinig to instructions from the computer which executes processing by linking processing based on various computer programs.

What is claimed is:

1. An output processing method used in an output apparatus which includes an output section configured to output at least one image based on at least on image data which has been acquired by an image-acquiring device, the method comprising:
   receiving an input which designates a staple position of the at least one image;
   transmitting a command to the image-data acquiring device to acquire the at least one image data based on the designation of the staple position;
   acquiring the at least one image data, which has been acquired by the image-data acquiring device, from the image-data acquiring device;
   storing the at least one image data at the output apparatus in association with the staple position;
   acquiring the staple position which has been associated with the at least one image data;
   setting a page-turning procedure which is an operating procedure for changing the at least one image to one of a subsequent image and a previous image on the output section based on the staple position;
   outputting the at least one image to the output section;
   receiving an input according to the page-turning procedure; and
   changing the at least one image on the output section in accordance with the input according to the page-turning procedure.

2. The output processing method according to claim 1, wherein setting the page-turning procedure includes outputting, to the output section, an operation button for changing the at least one image to one of the subsequent image and the previous image based on the staple position, and setting an operation to the operation button as the page-turning procedure.

3. The output processing method according to claim 2, wherein in a case of outputting the operation button to the output section, an operation button for changing the at least one image to the subsequent image is outputted on one side of the output section corresponding to the staple position, and an operation button for changing the at least one image to the previous image is outputted on an opposite side of the output section opposite to the one side with respect to the at least one image.

4. The output processing method according to claim 3, wherein in a case that the at least one image having the staple position on a top side is outputted on the output section, the operation button for changing the at least one image to the subsequent image is outputted on an upper portion of the output section, and the operation button for changing the at least one image to the previous image is outputted on a lower portion of the output section.

5. The output processing method according to claim 1, wherein the output apparatus further includes a sensor configured to output sensor data based on at least one of an approximation of an input medium toward the output section, a contact of the input medium with the output section, and an attitude of the output apparatus, and the page-turning procedure is set such that, in a case that at least one of a tilting direction associated with a change in the attitude of the output apparatus and a sliding direction of the input medium, which has been acquired based on the sensor data outputted from the sensor, is same as a staple direction from a center of the output section toward the staple position, the at least one image outputted to the output section is changed to the subsequent image, and in a case that at least one of the tilting direction and the sliding direction is opposite to the staple direction, the at least one image outputted to the output section is changed to the previous image.

6. The output processing method according to claim 1, wherein in a case of outputting a plurality of images to the output section, the plurality of images are outputted to the output section to be arranged in an order based on a staple direction from a center of the output section toward the staple position.

7. The output processing method according to claim 6, wherein the plurality of images have different page numbers respectively, and the plurality of images are outputted to the output section such that the page numbers of the plurality of images become greater toward a direction opposite to the staple direction.

8. An output apparatus configured to output at least one image based on at least one image data which has been acquired by an image-data acquiring device, the apparatus comprising:
   an output section configured to output the at least one image; and
   a processing section configured to:
   receive an input which designates a staple position of the at least one image;
   transmit a command to the image-data acquiring device to acquire the at least one image data based on the designation of the staple position;
   acquire the at least one image data, which has been acquired by the image-data acquiring device, from the image-data acquiring device;
   store the at least one image data at the output apparatus in association with the staple position;
   acquire the staple position of the which has been associated with the at least one image data;
   set a page-turning procedure which is an operating procedure for changing the at least one image to one of a subsequent image and a previous image based on the staple position;
   make the output section output the at least one image to the output section;
   receive an input according to the page-turning procedure; and
   change the at least one image on the output section in accordance with the input according to the page-turning procedure.

9. The output apparatus according to claim 8, wherein the processing section is configured to set the page-turning procedure by outputting, to the output section, an operation button for changing the at least one image to one of the subsequent image and the previous image based on the staple position, and setting an operation to the operation button as the page-turning procedure.

10. The output apparatus according to claim 9, wherein in a case of outputting the operation button to the output section, the processing section is configured to: output an operation button for changing the at least one image to the subsequent image on one side of the output section corresponding to the staple position; and output an operation button for changing the at least one image to the previous image on an opposite side of the output section opposite to the one side with respect to the at least one image.

11. The output apparatus according to claim 10, wherein in a case that the at least one image having the staple position on a top side is outputted on the output section, the processing section is configured to: output the operation button for changing the at least one image to the subsequent image on an upper portion of the output section; and output the operation button for changing the at least one image to the previous image on a lower portion of the output section.

12. A non-transitory computer-readable storage medium storing computer-executable instructions that, when executed by a processor, cause an output apparatus including an output section configured to output at least one image based on at least one image data which has been acquired by an image-data acquiring device, to:
receive an input which designates a staple position of the at least one image;
transmit a command to the image-data acquiring device to acquire the at least one image data based on the designation of the staple position;
acquire the at least one image data, which has been acquired by the image-data acquiring device, from the image-data acquiring device;
store the at least one image data at the output apparatus in association with the staple position;
acquire the staple position which has been associated with the at least one image data;
set a page-turning procedure which is an operating procedure for changing the at least one image to one of a subsequent image and a previous image based on the staple position;
output the at least one image to the output section;
receive an input according to the page-turning procedure, and
change the at least one image on the output section in accordance with the input according to the page-turning procedure.

13. The storage medium according to claim 12, wherein the instructions cause the output apparatus to set the page-turning procedure by outputting, to the output section, an operation button for changing the at least one image to one of the subsequent image and the previous image based on the staple position, and setting an operation to the operation button as the page-turning procedure.

14. The storage medium according to claim 13, wherein in a case of outputting the operation button to the output section, the instructions cause the output apparatus to: output an operation button for changing the at least one image to the subsequent image on one side of the output section corresponding to the staple position; and output an operation button for changing the at least one image to the previous image on an opposite side of the output section opposite to the one side with respect to the at least one image.

15. The storage medium according to claim 14, wherein in a case that the at least one image having the staple position on a top side is outputted on the output section, the instructions cause the output apparatus to: output the operation button for changing the at least one image to the subsequent image on an upper portion of the output section; and output the operation button for changing the at least one image to the previous image on a lower portion of the output section.

* * * * *